US008174812B2

(12) United States Patent
Montich

(10) Patent No.: US 8,174,812 B2
(45) Date of Patent: *May 8, 2012

(54) MECHANICALLY INTERLOCKED TRANSFER SWITCH

(75) Inventor: Eduardo Montich, Buenos Aires (AR)

(73) Assignee: EMA Electromechanics, LLC, Sweetwater, TX (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/535,483

(22) Filed: Aug. 4, 2009

(65) Prior Publication Data

US 2009/0302006 A1 Dec. 10, 2009

Related U.S. Application Data

(63) Continuation-in-part of application No. 11/840,948, filed on Aug. 18, 2007, now Pat. No. 7,724,489.

(51) Int. Cl.
*H02H 7/00* (2006.01)

(52) U.S. Cl. .......................................................... 361/115

(58) Field of Classification Search .................. 361/115
See application file for complete search history.

(56) References Cited

U.S. PATENT DOCUMENTS 4,016,385 A * 4/1977 Golioto ........................ 200/573
7,724,489 B2 * 5/2010 Montich ...................... 361/115

FOREIGN PATENT DOCUMENTS

JP 05174676 A 7/1993
JP 07161265 A 6/1995
JP 2000341858 A 12/2000

* cited by examiner

*Primary Examiner* — Stephen W Jackson
(74) *Attorney, Agent, or Firm* — Egbert Law Offices PLLC

(57) ABSTRACT

A transfer switch apparatus has first, second, and third electrical terminals extending outwardly from a housing. A first vacuum bottle is positioned in the housing and has a pair of contactors therein. A second vacuum bottle is positioned in the housing and has a pair of contactors therein. A mechanical linkage is movable between a first position and a second position. The first position electrically connects the first electrical terminal to the second electrical terminal. The second position electrically connects the third electrical terminal to the second electrical terminal. The first vacuum bottle and the second vacuum bottle are longitudinally aligned. The mechanical linkage is interposed between the first and second vacuum bottles.

20 Claims, 5 Drawing Sheets

MECHANICALLY INTERLOCKED TRANSFER SWITCH

CROSS-REFERENCE TO RELATED APPLICATIONS

The present application is a continuation-in-part of U.S. patent application Ser. No. 11/840948, filed on 18 Aug. 2007, and entitled "CIRCUIT BREAKER WITH HIGH SPEED MECHANICALLY-INTERLOCKED GROUNDING SWITCH", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a general purpose low, medium and high voltage vacuum transfer switch. More particularly, the present invention relates to a mechanically interlocked transfer switch. Additionally, the present invention relates to a high speed transfer switch capable of switching circuits within sixteen (16) milliseconds (0.016 seconds). Additionally, the present invention relates to a transfer switch capable of switching circuits with voltages within the range of 600 Volts to 72,000 Volts.

2. Description of Related Art Including Information Disclosed Under 37 CFR 1.97 and 37 CFR 1.98.

Various industrial, institutional, commercial, medical, data processing, communications, defense, research and other electrical power sensitive facilities and installations typically require a source of standby or emergency power. The source of standby or emergency power typically must be capable of very fast startup and load acceptance from a non-operating condition, with energy derived from various means including singular or combined systems such as:

- AC or DC prime or standby electrical generator sets powered by various prime movers, including but not limited to Diesel engines, gas engines, dual fuel engines, combustion turbines, steam turbines, water turbines and other prime movers;
- Systems for directly storing energy, including but not limited to batteries, conventional or ultra capacitors, flywheels, high pressure nitrogen or other gas accumulators or receivers, fluids stored at high differential heads, and suitable stored indirect sources of energy, including hydrocarbon fuels such as Diesel oil, compressed natural gas (CNG), Butane, Propane, Hydrogen and other fuels;
- Systems such as Uninterruptible Power Systems (UPS) for converting, conditioning, switching and otherwise making available high quality electrical power with minimal interruption, deriving their source of stored energy from one or more of the sources described above; and
- Standby or emergency power systems referred to hereinabove being capable of very fast, reliable and preferably mechanically interlocked switching from a source of normal, utility electrical supply over to a standby or emergency power supply, wherein re-transfer to the normal supply must also be accomplished with the same speed and with mechanical interlocking.

Alternatively or additionally, such electrical power sensitive facilities and installations may utilize or employ multiple independent incoming utility service feeders to provide utility electrical service from two (2) or more different utility sources. Such incoming utility feeders may provide electrical power at voltages typically ranging from nominal 5 kV to nominal 72 kV.

Any or all of the electrical power sensitive facilities and installations referred herein as well as conventional, non-sensitive installations may derive first cost and continuing economic, operational and reliability benefits by use of high-speed, mechanically interlocked low, medium or high voltage transfer switches. In certain cases, operation or reliability of various downstream feeder and/or distribution circuits may derive benefits from application of such high speed transfer switching.

Similarly, with transfer switches, the circuit to a load or substation can be broken upon the application of a manual force to a button or lever of the switch or by an automatic relay which actuates the switch. The activation of the switch changes the energy source from a first source to a second source to the load or substation. Alternatively, the transfer switch can change the load from a first load to a second load. The switch can be used to maintain a power flow without completely shutting down the system. Even in the event of repairs or interruptions, the power collection can be maintained.

The interruption of electrical power circuits has always been an effect of either a circuit breaker or switch, whether as a protective measure or a power management decision. In earliest times, circuits could be broken only by separation of contacts in air followed by drawing the resulting electric arc out to such a length that it can no longer be maintained. The basic problem is to control and quench the high power arc. This necessarily occurs at the separating of contacts of a switch or breaker when opening high current circuits. Since arcs generate a great deal of heat energy which is often destructive to the contacts, it is necessary to limit the duration of the arc and to develop contacts that can withstand the effect of the arc time after time.

A vacuum switch or circuit breaker uses the rapid dielectric recovery and high dielectric strength of the vacuum. The pair of contacts are hermetically sealed in the vacuum envelope. An actuating motion is transmitted through bellows to the movable contact. When the electrodes are parted, an arc is produced and supported by metallic vapor boiled from the electrodes. Vapor particles expand into the vacuum and condense on solid surfaces. At a natural current zero, the vapor particles disappear and the arc is extinguished.

In the past, various patents have issued relating to such vacuum switches and circuit breakers. For example, U.S. Pat. No. 5,612,523, issued on Mar. 18, 1997 to Hakamata et al., teaches a vacuum circuit-breaker and electrode assembly. A portion of a highly conductive metal member is infiltrated in voids of a porous high melting point metal member. Both of the metal members are integrally joined to each other. An arc electrode portion is formed of a high melting point area in which the highly conductive metal is infiltrated in voids of the high melting point metal member. A coil electrode portion is formed by hollowing out the interior of a highly conductive metal area composed only of the highly conductive metal and by forming slits thereon. A rod is brazed on the rear surface of the coil electrode portion.

U.S. Pat. No. 6,048,216, issued on Apr. 11, 2000 to Komuro, describes a vacuum circuit breaker having a fixed electrode and a movable electrode. An arc electrode support member serves to support the arc electrode. A coil electrode is contiguous to the arc electrode support member. This vacuum circuit breaker is a highly reliable electrode of high strength which will undergoes little change with the lapse of time.

U.S. Pat. No. 6,759,617, issued on Jul. 6, 2004 to S. J. Yoon, describes a vacuum circuit breaker having a plurality of switching mechanisms with movable contacts and stationary contacts for connecting/breaking an electrical circuit between an electric source and an electric load. The actuator unit includes at least one rotary shaft for providing the movable contacts with dynamic power so as to move to positions contacting the stationary contacts or positions separating from the stationary contacts. A supporting frame fixes and supports the switching mechanism units and the actuator unit. A transfer link unit is used to transfer the rotating movement of the rotary shaft to a plurality of vertical movements.

U.S. Pat. No. 7,223,923, issued on May 28, 2007 to Kobayashi et al., provides a vacuum switchgear. This vacuum switchgear includes an electro-conductive outer vacuum container and a plurality of inner containers disposed in the outer vacuum container. The inner containers and the outer container are electrically isolated from each other. One of the inner vacuum containers accommodates a ground switch for keeping the circuit open while the switchgear is opened. A movable electrode is connected to an operating mechanism and a fixed electrode connected to a fixed electrode rod. Another inner vacuum container accommodates a function switch capable of having at least one of the functions of a circuit breaker, a disconnector and a load switch.

It is an object of the present invention to provide a vacuum transfer switch with integral high speed of a relatively low cost.

It is a further object of the present invention to provide a vacuum transfer switch with an integral high speed that is mechanically interlocked.

It is a further object of the present invention to provide a vacuum transfer switch with an integral high speed which minimizes energy losses.

It is still a further object of the present invention to provide a vacuum transfer switch that can be applied and operated in the range of 0.6 kilovolts to 72 kilovolts.

It is still another object of the present invention to provide a vacuum transfer switch that is effective for use in association with installations such as described earlier.

These and other objects and advantages of the present invention will become apparent from a reading of the attached specification and appended claims.

BRIEF SUMMARY OF THE INVENTION

The present invention is a transfer switch apparatus that comprises a first set of electrical terminals extending outwardly of the apparatus, a second set of terminals extending outwardly of the apparatus, a third set of terminals extending outwardly of the apparatus, a first vacuum bottle having pairs of contactors therein, a second set of vacuum bottles having pairs of contactors therein, and a mechanical linkage movable between a first position and a second position. One of the pair of the contactors of the first vacuum bottle is electrically interconnected to the first electrical terminal. One of the pair of contactors of the second vacuum bottle is electrically interconnected to the third electrical terminal. A housing may be provided suitable for indoor or outdoor installation of the transfer switch. Provisions are made for cable, rigid bus or other electrical conductor connection to the transfer switch.

An actuator serves to move the mechanical linkage between the first position and the second position. The first vacuum bottle is in longitudinal alignment with the second vacuum bottle. The mechanical linkage is interposed between the first and second vacuum bottles.

The mechanical linkage comprises an actuator arm having the other of the pair of contactors of the first vacuum bottle electrically connected thereto. The actuator arm has the other of the pair of contactors of the second vacuum bottle electrically connected thereto. The actuator arm is electrically interconnected to the second electrical terminal. The pair of contactors of the first vacuum bottle being electrically connected together when in the first position. The pair of contactors of the first vacuum bottle are electrically isolated from each other in the second position. The pair of contactors of second vacuum bottle are electrically isolated from each other in the first position. The pair of contactors of the second vacuum bottle are electrically connected together in the second position. The first position serves to electrically connect the first electrical terminal to the second electrical terminal. The second position serves to electrically connect the third electrical terminal to the second electrical terminal.

The present invention is also a transfer switch apparatus that comprises a first vacuum bottle having a first contactor and a second contactor therein, a second vacuum bottle having a first contactor and a second contactor therein, an actuator arm connected at one end to the second contactor of the first vacuum bottle and to the first contactor of the second vacuum bottle, and a means for moving the actuator arm between a first position in which the second contactor contacts the first contactor of the first vacuum bottle and a second position in which the first contactor contacts the second contactor of the second vacuum bottle. The power supply will have a nominal voltage from 600 volts to 72,000 volts. There are two alternative versions for this apparatus.

In one embodiment, the transfer switch is between two different power supply sources where one or the other feed an only load. The actuator arm is interconnected to the load. In particular, an electric load is connected by a line to the actuator arm. A power supply source is connected by a bus to the first contactor of the first vacuum bottle. A second power supply source is connected by a bus to the second contactor of the second vacuum bottle. Power is passed from the first source to the load when the actuator arm is in the first position. Alternatively, power is passed from the second source to the load when the actuator arm is in the second position. The power supply has a three phase system. As such, the first vacuum bottle includes three vacuum bottles, the first contactor in each of the three vacuum bottles is connected to a separate phase of the first source. The second vacuum bottle also comprises three vacuum bottles, and the second contactor in each of the three vacuum bottles is connected to a separate phase of the second source. The first contactor of the first vacuum bottle is connected to a first electrical terminal. The actuator arm is electrically interconnected to a second electrical terminal. The second contactor of the second vacuum bottle is connected to a third electrical terminal. The first electrical terminal is connected to the first source, the second electrical terminal is connected to the load and the third electrical terminal is connected to the second source.

In another embodiment, the transfer switch is between two different loads where one or the other feed from an only power supply source. The actuator arm is interconnected to the source. In particular, a power supply source is connected by a bus to the actuator arm. An electric load is connected by a line to the first contactor of the first vacuum bottle. A second electric load is connected by a line to the second contactor of the second vacuum bottle. Power is passed from the source to the first load when the actuator arm is in the first position. Alternatively power is passed from the source to the second load when the actuator arm is in the second position. The power supply has a three phase system. As such, the first vacuum bottle includes three vacuum bottles, and the first contactor in each of the three vacuum bottles is connected to a separate phase of the first load. The second vacuum bottle also comprises three vacuum bottles, and the second contactor in each of the three vacuum bottles is connected to a separate phase of the second load. The first contactor of the first vacuum bottle is connected to a first electrical terminal. The actuator arm is electrically interconnected to a second electrical terminal. The second contactor of the second vacuum bottle is connected to a third electrical terminal. The first electrical terminal is connected to the first load, the second electrical terminal is connected to the source, and the third electrical terminal is connected to the second load.

The present invention is also a system for passing energy from two alternative power supply sources to an electric load, or from a power electric source to two alternative electric loads.

In one embodiment, there are two alternative power supply sources to an electric load. This system comprises two buses suitable for passing energy from the power supply sources, a line suitable for passing energy from the buses to the load, and a transfer switch interconnected between a contactor of the first bus and a contactor of the line and a contactor of the second bus. The transfer switch has means for mechanically and selectively connecting the contactor of the first bus to the contactor of the line or for connecting the contactor of the second bus to the contactor of the line. The first vacuum bottle has the contactor for the first bus and the contactor for the line therein. The second vacuum bottle has the contactor for the line and the contactor for the second bus therein. The mechanical interlock extends between the first and second vacuum bottles and is electrically interconnected to the line.

In another embodiment, there is a power supply source to two alternative electric loads. This system comprises a bus suitable for passing energy from the power supply source, two lines suitable for passing energy from the bus to the loads, and a transfer switch interconnected between a contactor of the first line and a contactor of the bus and a contactor of the second line. The transfer switch has means for mechanically and selectively connecting the contactor of the bus to the contactor of the first line or for connecting the contactor of the bus to the contactor of the second line. The first vacuum bottle has the contactor for the first line and the contactor for the bus therein. The second vacuum bottle has the contactor for the bus and the contactor for the second line therein. The mechanical interlock extends between the first and second vacuum bottles and is electrically interconnected to the bus.

DETAILED DESCRIPTION OF THE INVENTION

Figure 1:
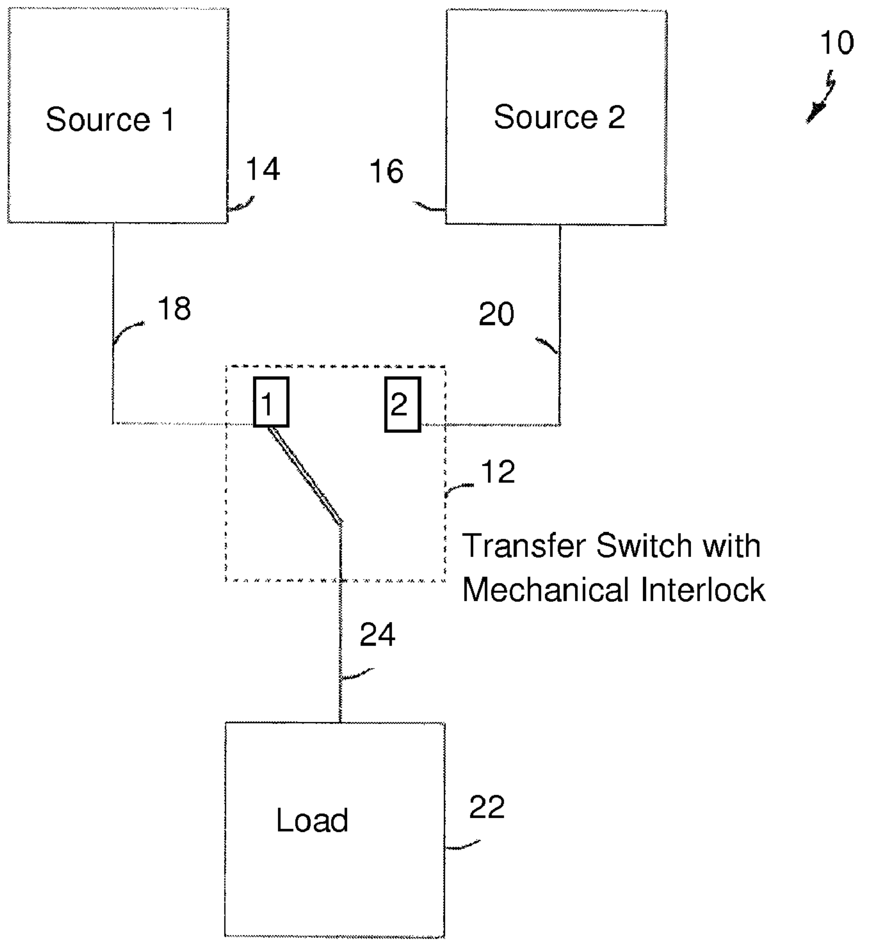
FIG. 1 is a block diagram showing the transfer switch system of the present invention for transfer between two different power supply sources where one or the other feed an only load.

Referring to FIG. 1, there is shown the system 10 of the present invention for transfer between two different power supply sources where one or the other feed an only load. The transfer switch system 10 of the present invention includes the transfer switch apparatus 12 as used for transferring energy from the power supply sources to the load. Two different power supply sources, 14 and 16 are connected by respective buses 18 and 20 to the transfer switch apparatus 12. An electric load 22 is connected by the line 24 to the transfer switch apparatus 12. When the mechanical interlock of the transfer switch 12 is suitably placed in its first position, then the energy will be delivered from source 14 along bus 18 to load 22 along line 24, wherein, in this first position, source 16 is not connected to the load. When the mechanical interlock of the transfer switch breaker 12 is moved to its second position, then the energy will be delivered from source 16 along bus 20 to load 22 along line 24, wherein, in this second position, source 14 is not connected to the load. As such, it is the goal of the transfer switch apparatus 12 to switch between power supply sources as quickly as possible. Switching time is minimized and occurs in the sub-cycle range.

Figure 2:
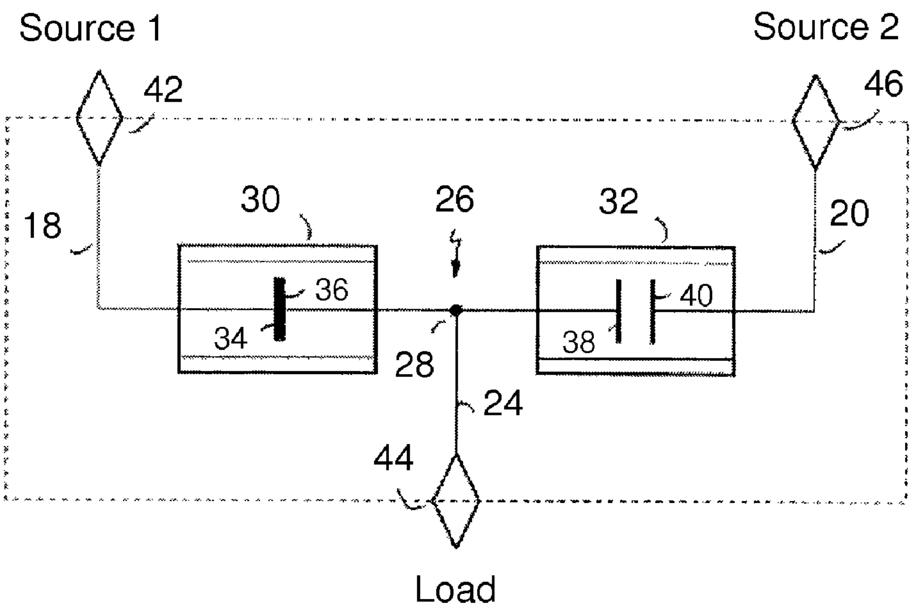
FIG. 2 is a schematic view illustrating the mechanical interlock of the present invention for a transfer switch between two different power supply sources where one or the other feed an only load in combination of the first and second vacuum bottles, the mechanical interlock being in a first position.

FIG. 2 illustrates the operation of the mechanical interlock 26 of the present invention. As can be seen, the mechanical interlock 26 includes an actuator arm 28 which extends between the first vacuum bottle 30 and the second vacuum bottle 32. The actuator arm 28 is connected by line 24 to the second electrical terminal 44.

The first vacuum bottle 30 is hermetically sealed in a vacuum condition. The first vacuum bottle 30 includes a first contactor 34 and a second contactor 36 within the interior of the vacuum bottle 30. The first contactor 34 is connected by bus 18 in electrical interconnection to the first electrical terminal 42. The second vacuum bottle 32 includes a first contactor 38 and a second contactor 40. The second contactor 40 is connected by bus 20 to the third electrical terminal 46.

In FIG. 2, the actuator arm 28 is in its first position. In this position, the contactors 34 and 36 are juxtaposed together so as to be in electrical connection. As such, power passing from electrical terminal 42 along bus 18 will be transmitted through the interior of the first vacuum bottle 30 through line 24 to the electrical terminal 44. The circuit between the other source and the load through the second vacuum bottle 32 is open.

Figure 3:
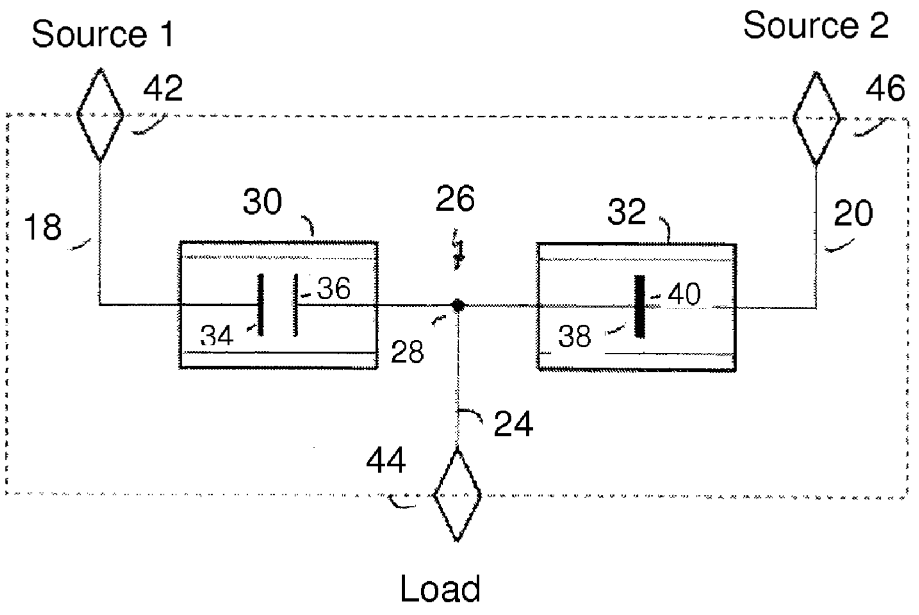
FIG. 3 is a schematic view illustrating the operation of the mechanical interlock of the present invention for a transfer switch between two different power supply sources where one or the other feed an only load, the mechanical interlock being in a second position.

When a switching between sources is externally ordered, the actuator arm 28 moves to its second position so that connection of electrical terminal 44 with electrical terminal 42 is switched to the electrical terminal 46 instantaneously. As can be seen in FIG. 3, the first contactor 34 is electrically isolated from the second contactor 36 within the interior of vacuum bottle 30. As such, the bus 18 is electrically isolated from power passing from the electrical terminal 42. The actuator arm 28 instantaneously separates the contactor 36 from the contactor 34 while, at the same time, establishes an electrical connection between the contactor 38 and the contactor 40 in the second vacuum bottle 32. As such, the power received by line 24 is immediately switched to bus 20.

Figure 4:
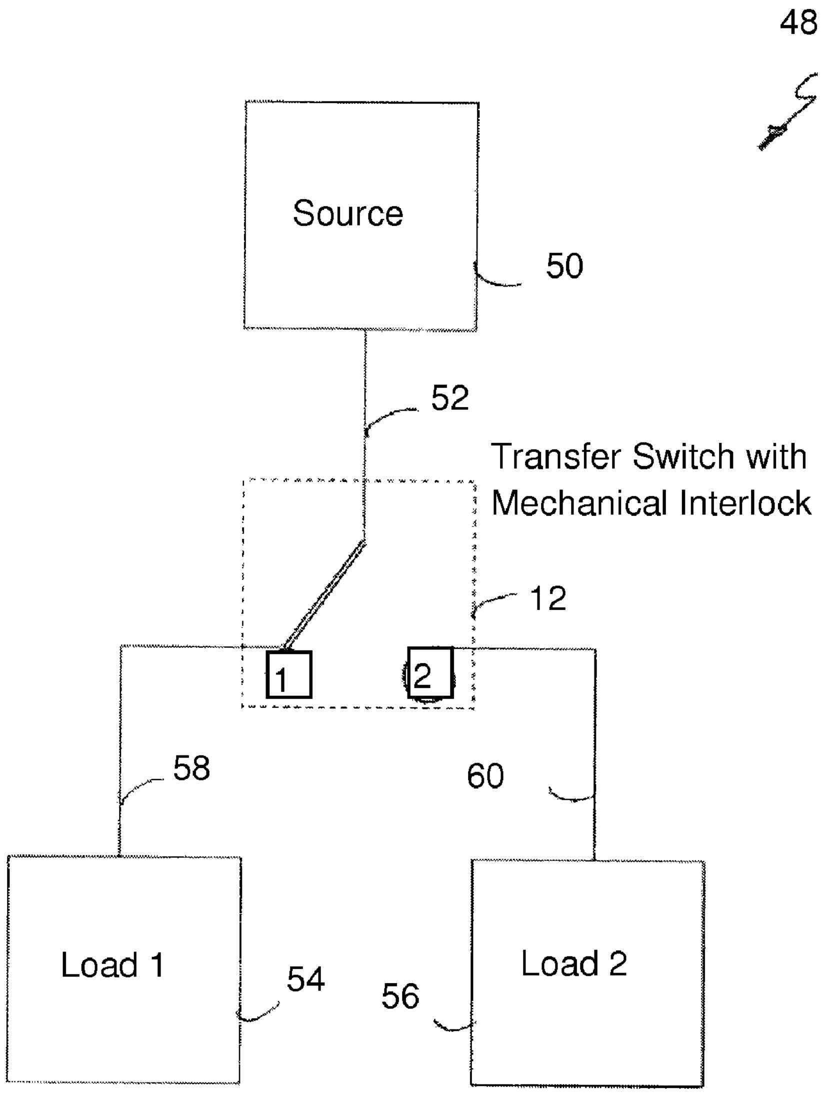
FIG. 4 is a block diagram showing the transfer switch system of the present invention for transfer between two different loads where one or the other are fed from an only power supply source.

Referring to FIG. 4, there is shown the system 48 of the present invention for transfer between two different loads where one or the other are fed from an only power supply source. The transfer switch system 48 of the present invention includes the transfer switch apparatus 12 as used for transferring energy from the power supply source to the loads. A power supply source 50 is connected by the bus 52 to the transfer switch apparatus 12. Two different electric loads, 54 and 56 are connected by respective lines 58 and 60 to the transfer switch apparatus 12. When the mechanical interlock of the transfer switch 12 is suitably placed in its first position, then the energy will be delivered from source 50 along bus 52 to load 54 along line 58, in this first position load 56 is not connected to the source. When the mechanical interlock of the transfer switch breaker 12 is moved to its second position, then the energy will be delivered from source 50 along bus 52 to load 56 along line 60, in this second position load 54 is not connected to the source. As such, it is the goal of the transfer switch apparatus 12 to switch between electric loads as quickly as possible. Switching time is minimized and occurs in the sub-cycle range.

Figure 5:
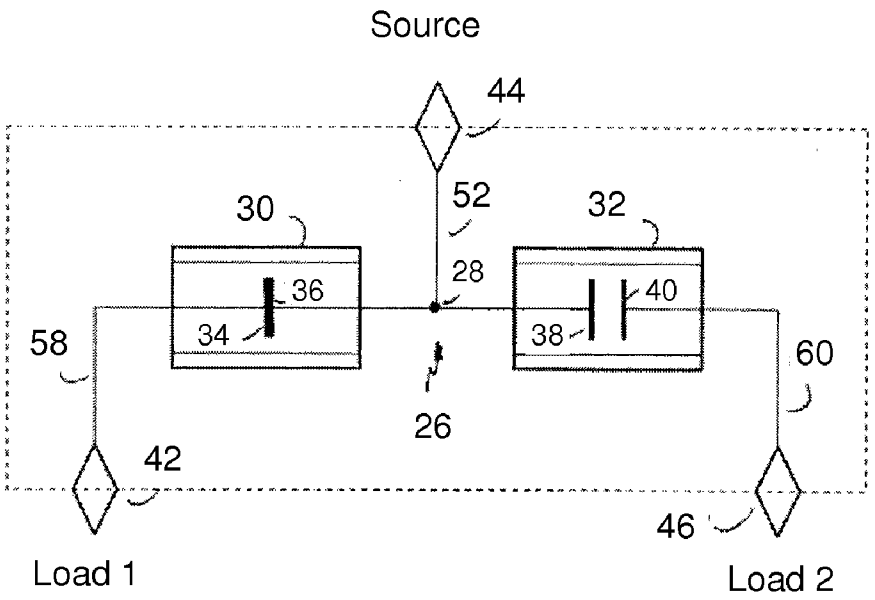
FIG. 5 is a schematic view illustrating the mechanical interlock of the present invention for a transfer switch between two different loads where one or the other are fed from an only power supply source in combination of the first and second vacuum bottles, the mechanical interlock being in a first position.

FIG. 5 illustrates the operation of the mechanical interlock 26 of the present invention. As can be seen, the mechanical interlock 26 includes an actuator arm 28 which extends between the first vacuum bottle 30 and the second vacuum bottle 32. The actuator arm 28 is connected by bus 52 to the second electrical terminal 44.

The first vacuum bottle 30 is hermetically sealed in a vacuum condition. The first vacuum bottle 30 includes a first contactor 34 and a second contactor 36 within the interior of the vacuum bottle 30. The first contactor 34 is connected by line 58 in electrical interconnection to the first electrical terminal 42. The second vacuum bottle 32 includes a first contactor 38 and a second contactor 40. The second contactor 40 is connected by line 60 to the third electrical terminal 46.

In FIG. 5, the actuator arm 28 is in its first position. In this position, the contactors 34 and 36 are juxtaposed together so as to be in electrical connection. As such, power passing from electrical terminal 44 along bus 52 will be transmitted through the interior of the first vacuum bottle 30 through line 58 to the electrical terminal 42. The circuit between source and the other load through the second vacuum bottle 32 is open.

Figure 6:
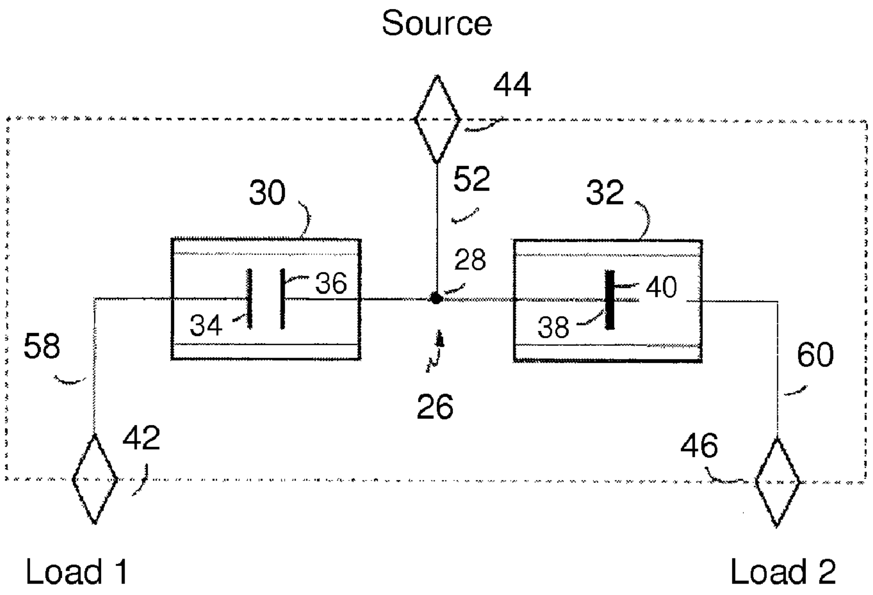
FIG. 6 is a schematic view illustrating the operation of the mechanical interlock of the present invention for a transfer switch between two different loads where one or the other are fed from an only power supply source, the mechanical interlock being in a second position.

When a switching between loads is externally ordered, the actuator arm 28 moves to its second position so that connection of electrical terminal 44 with electrical terminal 42 is switched to the electrical terminal 46 instantaneously. As can be seen in FIG. 6, the first contactor 34 is electrically isolated from the second contactor 36 within the interior of vacuum bottle 30. As such, the line 58 is electrically isolated from power passing from the electrical terminal 44. The actuator arm 28 instantaneously separates the contactor 36 from the contactor 34 while, at the same time, establishes an electrical connection between the contactor 38 and the contactor 40 in the second vacuum bottle 32. As such, the power transmitted by bus 52 is immediately switched to line 60.

A variety of techniques can be utilized for moving the actuator arm 28 between the first and second position. For example, latches, springs, magnets, or other devices can be employed so as to instantaneously shift the actuator arm 28 between the first and second positions. Importantly, the alignment of the first vacuum bottle 30 with the second vacuum bottle 32 assures that this mechanical connection instantaneously serves to transfer energy. The present invention avoids the need for electrical-interlocked transfers devices.

Figure 7:
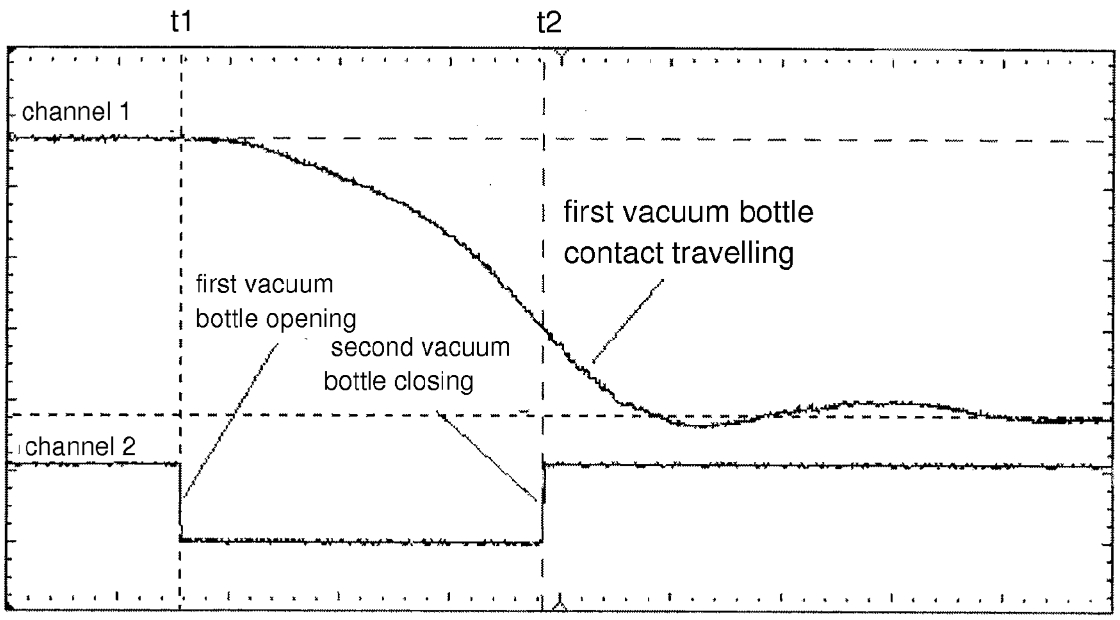
FIG. 7 is a graph showing the switching operation of the transfer switch of the present invention.

In FIG. 7, the near instantaneous switching can be easily seen. In FIG. 7, channel one is the analog representation of the first vacuum bottle contact traveling. Channel two is the representation of the contact mechanical positions of both first vacuum bottle and second vacuum bottle, connected in a parallel circuit. The oscillogram of FIG. 7 shows that the complete switching sequence (i.e. the time duration for opening the first vacuum bottle through closing the second vacuum bottle) is accomplished between times t1 and t2. Switching time is minimized and occurs in the sub-cycle range. The first vacuum bottle contact traveled more than 75% of its total stroke when the second vacuum bottle is closed.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A transfer switch apparatus comprising:
- a housing;
- a first electrical terminal extending outwardly of said housing;
- a second electrical terminal extending outwardly of said housing;
- a third electrical terminal extending outwardly of said housing;
- a first vacuum bottle being positioned in said housing and having a pair of contactors therein, one of said pair of contactors being electrically interconnected to said first electrical terminal;
- a second vacuum bottle being positioned in said housing and having a pair of contactors therein, one of said pair of contactors of said second vacuum bottle being electrically interconnected to said third electrical terminal; and
- a mechanical linkage being electrically interconnected to said second electrical terminal, said mechanical linkage being movable between a first position and a second position, said first position electrically connecting said first electrical terminal to said second electrical terminal, said second position electrically connecting said second electrical terminal to said third electrical terminal.

2. The transfer switch apparatus of claim 1, further comprising:
- an actuating means for moving said mechanical linkage between said first position and said second position.

3. The transfer switch apparatus of claim 1, said first vacuum bottle being in longitudinal alignment with said second vacuum bottle, said mechanical linkage being interposed between said first vacuum bottle and said second bottle.

4. The transfer switch apparatus of claim 1, said mechanical linkage comprising an actuator arm having the other of said pair contactors of said first vacuum bottle electrically connected thereto, said actuator arm having the other of said pair of contactors of said second vacuum bottle electrically connected thereto.

5. The transfer switch apparatus of claim 1, said pair of contactors of said first vacuum bottle being electrically connected together in said first position, said pair of contactors of said first vacuum bottle being electrically isolated from each other in said second position.

6. The transfer switch apparatus of claim 5, said pair of contactors of said second vacuum bottle being electrically isolated from each other in said first position, said pair of contactors of said second vacuum bottle being electrically connected together in said second position.

7. A transfer switch apparatus comprising:

a first vacuum bottle having a first contactor and a second contactor therein;

a second vacuum bottle having a first contactor and a second contactor therein;

an actuator arm connected at one end to said second contactor of said first vacuum bottle and to said first contact or of said second vacuum bottle; and a means for moving said actuator arm between a first position in which said second contactor of said first vacuum bottle contacts said first contactor of said first vacuum bottle and a second position in which said first contactor of said second vacuum bottle contacts said second contactor of said second vacuum bottle.

8. The transfer switch apparatus of claim 7, wherein said first contactor of said first vacuum bottle connects to a power supply source, said second contactor of said second vacuum bottle being connected to another power supply source, said actuator arm being interconnected to an electric load, or wherein said first contactor of said first vacuum bottle connects to an electric load, said second contactor of said second vacuum bottle being connected to another electric load, said actuator arm being interconnected to a power supply source.

9. The transfer switch apparatus of claim 7, further comprising:

an electric load connected by a line to said actuator arm;

a power supply source connected by a bus to said first contactor of said first vacuum bottle;

another power supply source connected by a bus to said second contactor of said second vacuum bottle;

a means for passing power from said first power supply source to said electric load when said actuator arm is in said first position and from said second power supply source to said electric load when said actuator arm is in said second position.

10. The transfer switch apparatus of claim 7, further comprising:

a power supply source connected by a bus to said actuator arm;

an electric load connected by a line to said first contactor of said first vacuum bottle;

another electric load connected by a bus to said second contactor of said second vacuum bottle; and a means for passing power from said power supply source to said first electric load when said actuator arm is in said first position, said means for passing power from said power supply source to said second electric load when said actuator arm is in said second position.

11. The transfer switch apparatus of claim 9, wherein the power supply sources have a three phase system, said electric load having a three phase system, said actuator arm having a three phase system, said first vacuum bottle comprising three vacuum bottles, the first contactor in each of said three vacuum bottles being connected to a separate phase of said first power supply, said second vacuum bottle comprising three vacuum bottles, the second contactor in each of said three vacuum bottles being connected to a separate phase of said second power supply, said three phase system of said actuator arm being connected to a separate phase of said electric load.

12. The transfer switch apparatus of claim 10, wherein said electric loads have a three phase system, said actuator arm having a three phase system, said first vacuum bottle comprising three vacuum bottles, the first contactor in each of said three vacuum bottles being connected to a separate phase of said first electric load, said second vacuum bottle comprising three vacuum bottles, the second contactor in each of said three vacuum bottles being connected to a separate phase of said second electric load, said three phase system of said actuator arm being connected to a separate phase of said power supply source.

13. The transfer switch apparatus of claim 12, wherein said first contactor of said first vacuum bottle connects to a first electrical terminal, said actuator arm being electrically interconnected to a second electrical terminal, said second contactor of said second vacuum bottle being connected to a third electrical terminal; and wherein said first electrical terminal connects to said first power supply source, said second electrical terminal connected to said electric load, said third electrical terminal being connected to said second power supply source; or wherein said first electrical terminal connects to said first electric load, said second electrical terminal connected to said power supply source, said third electrical terminal being connected to said second electric load.

14. The transfer switch apparatus of claim 13, further comprising:

an enclosure extending over and around the first and second vacuum bottles, the first, second and third electrical terminals extending outwardly of said enclosure.

15. The transfer switch apparatus of claim 9, the power supply sources having a voltage from 600 volts to 72,000 volts.

16. A system for passing energy from two alternative power supply sources to an electric load, or from a power supply source to two alternative electric loads, the system comprising:

two buses suitable for passing energy from the power supply sources;

a line connected to electric load;

a circuit suitable for alternatively passing energy from any of the said buses to the line; and a transfer switch interconnected between a contactor of said first bus and a contactor of said line and a contactor of said second bus, said transfer switch having means for mechanically and selectively connecting the contactor of the first bus to the contactor of the line or connecting the contactor of the second bus to the contactor of the line.

17. A system for passing energy from two alternative power supply sources to an electric load, or from a power supply source to two alternative electric loads, the system comprising:

a bus suitable for passing energy from the power supply source;

two lines respectively connected to both electric loads;

a circuit suitable for alternatively passing energy from said bus to any of the said lines; and a transfer switch interconnected between a contactor of said first line and a contactor of said bus and a contactor of said second line, said transfer switch having means for mechanically and selectively connecting the contactor of the bus to the contactor of the first line or connecting the contactor of the bus to the contactor of the second line.

18. The system of claim 16, further comprising:

a first vacuum bottle having the contactor for the first bus and the contactor for the line;

a second vacuum bottle having the contactor for the line and the contactor for the second bus; and a mechanical linkage extending between the first and second vacuum bottles, said mechanical linkage being electrically interconnected to said line.

19. The system of claim 17, further comprising:

a first vacuum bottle having the contactor for the first line and the contactor for the bus;

a second vacuum bottle having the contactor for the bus and the contactor for the second line; and a mechanical linkage extending between the first and second vacuum bottles, said mechanical linkage being electrically interconnected to said bus.

20. The system of claim 16, wherein, when said line is connected to the first bus, the means for connecting the second bus is minimized, occurring in a sub-cycle range, and vice-versa, or when said bus is connected to the first line, the means for connecting the second line is minimized, occurring in a sub-cycle range, and vice-versa.

* * * * *